United States Patent
Scaria et al.

(10) Patent No.: US 10,957,317 B2
(45) Date of Patent: Mar. 23, 2021

(54) VEHICLE LANGUAGE PROCESSING

(71) Applicant: Ford Global Technologies, LLC, Dearborn, MI (US)

(72) Inventors: Lisa Scaria, Milpitas, CA (US); Ryan Burke, Palo Alto, CA (US); Praveen Narayanan, San Jose, CA (US); Francois Charette, Tracy, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 16/164,355

(22) Filed: Oct. 18, 2018

(65) Prior Publication Data

US 2020/0126546 A1 Apr. 23, 2020

(51) Int. Cl.
| | | |
|---|---|---|
| *G10L 15/22* | (2006.01) | |
| *G10L 25/84* | (2013.01) | |
| *G10L 15/18* | (2013.01) | |
| *G10L 15/16* | (2006.01) | |
| *G10L 15/30* | (2013.01) | |

(52) U.S. Cl.
CPC .............. *G10L 15/22* (2013.01); *G10L 15/16* (2013.01); *G10L 15/18* (2013.01); *G10L 25/84* (2013.01); *G10L 15/30* (2013.01); *G10L 2015/223* (2013.01)

(58) Field of Classification Search
CPC ... G10L 15/20; G10L 15/22; G10L 2015/226; G10L 21/0208; G10L 2021/02166
See application file for complete search history.

(56) References Cited

U.S. PATENT DOCUMENTS

| | | | |
|---|---|---|---|
| 7,895,039 B2 * | 2/2011 | Braho | .................. G10L 15/065 704/251 |
| 9,224,394 B2 | 12/2015 | Schalk et al. | |
| 9,286,029 B2 | 3/2016 | Raux et al. | |
| 9,443,527 B1 | 9/2016 | Watanabe et al. | |
| 9,484,027 B2 | 11/2016 | Zhao et al. | |
| 2009/0083034 A1 * | 3/2009 | Hernandez | ............. G10L 15/22 704/251 |
| 2013/0185078 A1 * | 7/2013 | Tzirkel-Hancock | .... G10L 15/22 704/275 |

(Continued)

FOREIGN PATENT DOCUMENTS

| | | |
|---|---|---|
| DE | 102016125104 A1 | 7/2017 |
| WO | 2017112813 A1 | 6/2017 |

OTHER PUBLICATIONS

Alessio Brutti, et. al., "Use of Multiple Speech Recognition Units in a In-Car Assistance System", ResearchGate Jan. 2006, retrieved from Internet URL: https://www.researchgate.net/publication/225204524_Use_of_Multiple_Speech_Recognition_Units_in_an-In-car_Assistance_System (14 pages).

*Primary Examiner* — Mark Villena
(74) *Attorney, Agent, or Firm* — Brandon Hicks Bejin Bieneman PLC

(57) ABSTRACT

A computing system can determine a vehicle command based on a received spoken language command and determined confidence levels. The computing system can operate a vehicle based on the vehicle command. The computing system can further determine the spoken language command by processing audio spectrum data corresponding to spoken natural language with an automatic speech recognition (ASR) system.

7 Claims, 5 Drawing Sheets

(56) References Cited

U.S. PATENT DOCUMENTS

| | | | | |
|---|---|---|---|---|
| 2014/0303983 A1* | 10/2014 | Bapat | ................. | H04K 1/00 |
| | | | | 704/273 |
| 2016/0365092 A1* | 12/2016 | Moreno Mengibar | ................. | |
| | | | | G10L 15/197 |
| 2017/0213549 A1 | 7/2017 | Hassani et al. | | |
| 2018/0350395 A1* | 12/2018 | Simko | ................. | G10L 15/065 |
| 2019/0172453 A1* | 6/2019 | Zhao | ................. | G10L 15/08 |

* cited by examiner

VEHICLE LANGUAGE PROCESSING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
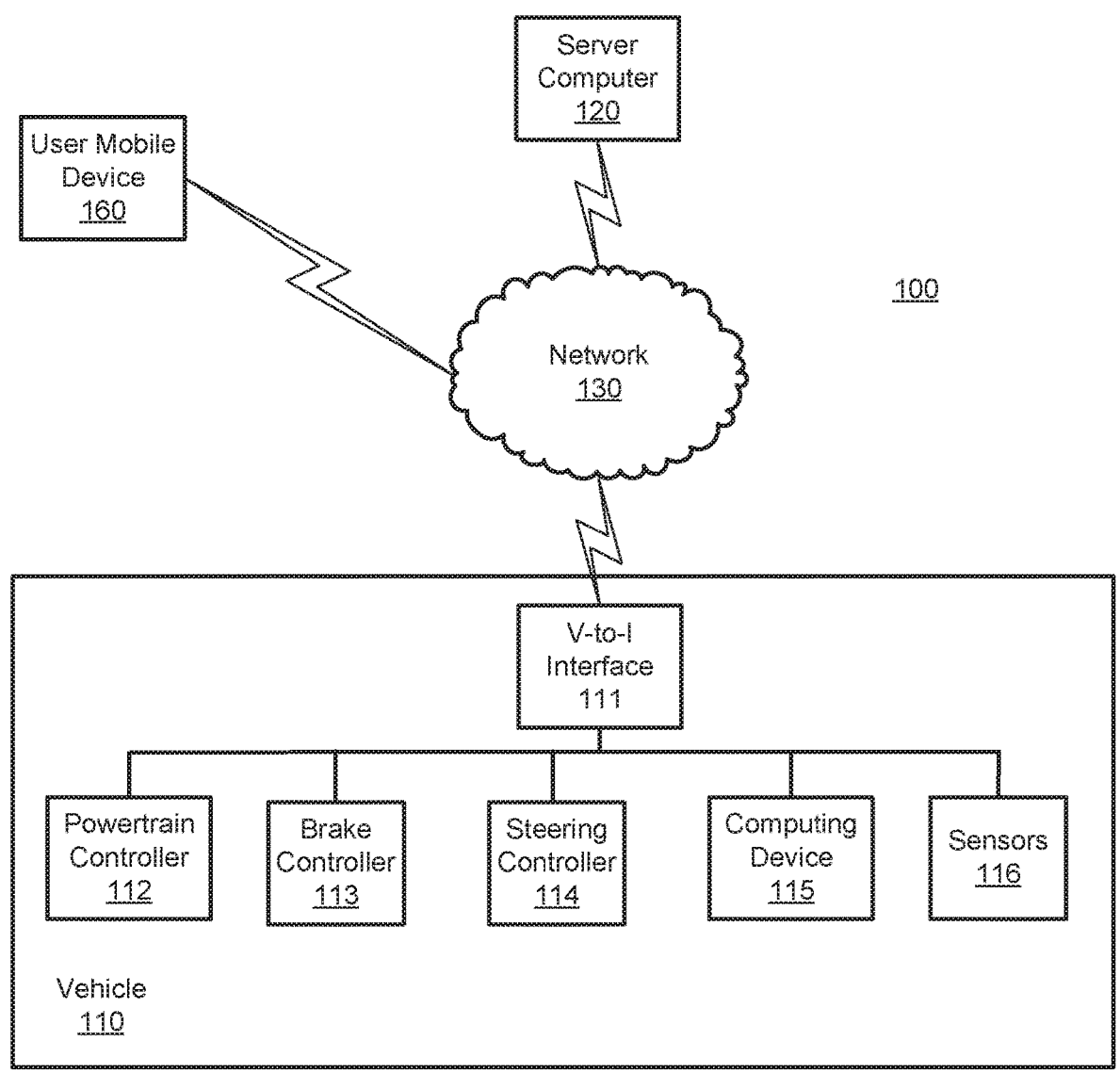
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode, for example, wherein the computing device can provide information to controllers to operate vehicle on a roadway in traffic including other vehicles. Based on sensor data, a computing device can determine a path for a vehicle to travel to reach a destination on a roadway in the presence of other vehicles and pedestrians, wherein a path is defined as a line connecting successive locations of a vehicle as it moves from a first location on a roadway to a second location on a roadway. A path wherein the line connecting a first location and a second location is defined by polynomial function is a path polynomial.

Vehicles can rely on spoken language input from an occupant of a vehicle to determine a vehicle path polynomial. A computing device in a vehicle can input spoken language commands by acquiring audio spectrum data corresponding to the spoken language commands with an audio input system that includes a microphone and an analog-to-digital (A/D) converter that acquire and convert sound waves to digital audio spectrum data. The audio spectrum data can be processed by a natural language understanding (NLU) system to determine a vehicle command that can be processed by a computing device to determine a path polynomial upon which to operate the vehicle. Vehicle commands are instructions related to the operation of a vehicle. For example, spoken language commands such as "turn left", "speed up", "slow down", etc. can be spoken by an occupant. These spoken language commands can be acquired and processed to determine vehicle commands that can be received by a computing device and interpreted to provide information that can be used to direct the operation of the vehicle. Directing the operation of the vehicle can include providing vehicle command information to a process that determines a path polynomial.

Disclosed herein is a method, including determining a vehicle command by processing a received spoken language command and determined confidence levels with a natural language understanding (NLU) system, and operating a vehicle based on the vehicle command. The spoken language command can be determined by processing audio spectrum data corresponding to a spoken natural language with an automatic speech recognition (ASR) system. The ASR system can determine confidence levels for each word of the spoken language command based on a vehicle noise model. The vehicle noise model can be determined by a machine learning system that inputs vehicle background noise. The machine learning system can be a rule-based state machine. The natural language understanding (NLU) system can include a deep neural network decoder and a deep neural network encoder.

The NLU system can input the spoken language command and confidence levels corresponding to each word in the spoken language command and determine the vehicle command using the deep neural network decoder. The deep neural network decoder can be trained using ground truth based on spoken language commands translated into vehicle commands and simulated vehicle noise based on the vehicle noise model. Operating the vehicle can include determining a path polynomial. The path polynomial can be based on the vehicle command. Operating the vehicle can include determining speed differences between the vehicle and objects in an environment around the vehicle. The speed differences between the vehicle and objects in an environment around the vehicle can be determined based on vehicle sensor input. Operating the vehicle can include controlling vehicle powertrain, braking, and steering.

Further disclosed is a computer readable medium, storing program instructions for executing some or all of the above method steps. Further disclosed is a computer programmed for executing some or all of the above method steps, including a computer apparatus, programmed to determine a vehicle command by processing a received spoken language command and determine confidence levels with a natural language understanding (NLU) system, and operate a vehicle based on the vehicle command. The spoken language command can be determined by processing audio spectrum data corresponding to a spoken natural language with an automatic speech recognition (ASR) system. The ASR system can determine confidence levels for each word of the spoken language command based on a vehicle noise model. The vehicle noise model can be determined by a machine learning system that inputs vehicle background noise. The machine learning system can be a rule-based state machine. The natural language understanding (NLU) system can include a deep neural network decoder and a deep neural network encoder.

The computer apparatus can be further programmed to input the spoken language command and confidence levels corresponding to each word in the spoken language command to the NLU system and determine the vehicle command using the deep neural network decoder. The deep neural network decoder can be trained using ground truth based on spoken language commands translated into vehicle commands and simulated vehicle noise based on the vehicle noise model. Operating the vehicle can include determining a path polynomial. The path polynomial can be based on the vehicle command. Operating the vehicle can include determining speed differences between the vehicle and objects in an environment around the vehicle. The speed differences between the vehicle and objects in an environment around the vehicle can be determined based on vehicle sensor input. Operating the vehicle can include controlling vehicle powertrain, braking, and steering.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, a power level applied to controllers 112, 113, 114 in the vehicle 110, connectivity between components, and accurate and timely performance of components of the vehicle 110.

Figure 2:
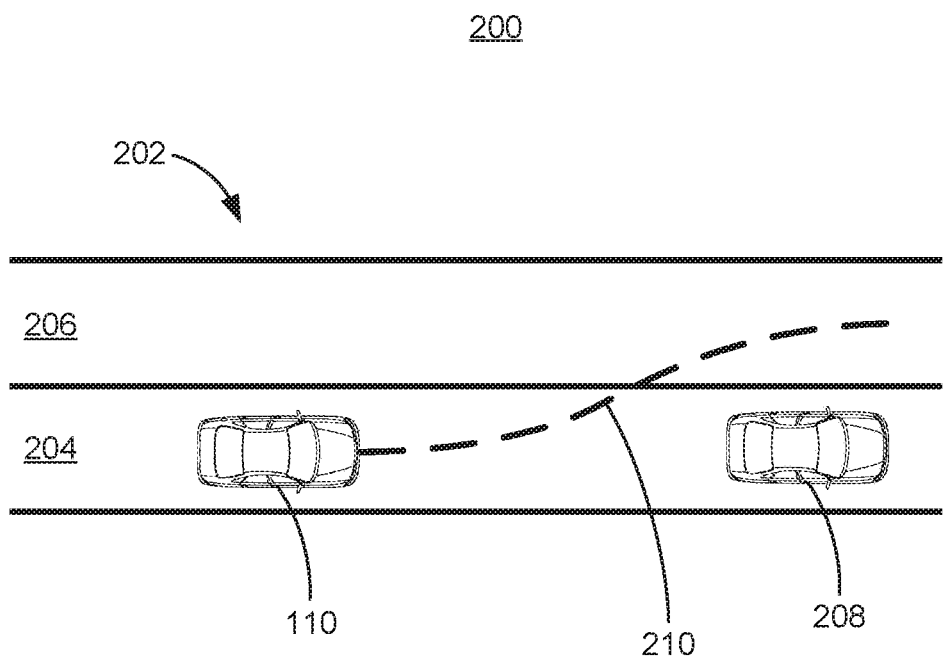
FIG. 2 is a diagram of an example traffic scene.

FIG. 2 is a diagram of an example traffic scene 200. Traffic scene 200 includes a roadway 202 having a lane 204 occupied by a vehicle 110 and another vehicle 208, both traveling on roadway 202. Computing device 115 can operate vehicle 110 on a roadway 202 by acquiring sensor 116 data including video sensors, lidar sensors and radar sensors to determine the location and relative speed of objects such as another vehicle 208 in a real world environment around vehicle 110. The location, speed and direction of vehicle 110 in a real world coordinate system can be defined by the six-axis 3D pose of vehicle 110, including 3D spatial coordinates in x, y, and z directions relative to a global reference frame like latitude, longitude and altitude, and 3D rotational coordinates in roll, pitch and yaw relative to the x, y, and z axes. Six-axis 3D pose and accelerations on each of the six axes define the location, speed and direction of vehicle 110 in 3D space.

Operating vehicle 110 on a roadway 202 can be accomplished by estimating future locations, speeds, and directions for vehicle 110. The future locations, speeds, and directions for vehicle 110 can be determined based on a vehicle command. A vehicle command is an instruction regarding the operation of a vehicle 110 on roadway 202 and can be determined by computing device 115 as a step in a process to autonomously or semi-autonomously operate vehicle 110. Examples of vehicle commands include "stop", "accelerate to a target speed", "turn left at intersection", etc. Computing device 115 can also determine a vehicle command based on spoken language input from an occupant of a vehicle 110. The spoken language input can be acquired and processed by computing device 115 to determine a vehicle command to operate vehicle 110. Techniques discussed herein can improve the operation of a vehicle 110 based on spoken language input by determining confidence levels based on a vehicle noise model. The confidence levels can improve the operation a natural language understanding (NLU) system to determine vehicle commands based on spoken language input.

Computing device 115 can process a vehicle command and determine a path polynomial 210 that computing device 115 can use to operate vehicle 110 and thereby execute a vehicle command. A path polynomial 210 is a first, second or third degree polynomial function that illustrates successive locations of a vehicle 110 as it executes a vehicle command and thereby travels on a roadway 202. Computing device 115 can determine a path polynomial 210 based on predicted motion of vehicle 110 estimated based on empirical data. Computing device can determine a path polynomial 210 based on vehicle location, speed, and direction, location, speed, and direction of objects such as other vehicle 208 and an end location, speed, and direction based on the vehicle command that maintains lateral and longitudinal accelerations between upper and lower limits. Computing device 115 can operate vehicle 110 on path polynomial by sending commands to controllers 112, 113, 114 to direct vehicle 110 powertrain, brakes, and steering to cause vehicle 110 to travel along path polynomial 210.

For example, in traffic scene 200, vehicle 110 can be approaching another vehicle 208 at a speed greater than the speed of the other vehicle 208. Computing device 115 can include a rule-based machine intelligence system to detect and measure speed differences between vehicle 110 and objects in a real world environment around vehicle 110, including another vehicle 208, for example, based on sensor 116 data. The rule-based machine intelligence system can be a finite state machine, for example, wherein a vehicle state is maintained corresponding to current vehicle status, including vehicle 110 location, speed and direction and location, speed, relative to roadway 202 and lane 204. Based on current state information and vehicle sensor 116 input for nearby objects, a rule-based finite state machine can be programmed to output a vehicle command to direct computing device 115 to operate vehicle 110.

Rule-based finite state machines (or simply "rule-based state machines") can be programmed by anticipating vehicle states and sensor 116 inputs and associating output vehicle commands with each anticipated vehicle state according to anticipated sensor 116 input. For example, in traffic scene 200, vehicle 110 state can include "in lane 204", "speed=target speed", and "adjacent lane 206=empty". In this example, sensor 116 input to a rule-based state machine can indicate that vehicle 110 is approaching another vehicle 208 determining a path polynomial which predicts that if no action is taken by computing device 115, vehicle 110 will approach another vehicle 208 more closely than a user input limit. that can be used by computing device 115 to determine a path polynomial 210. Upon determining that a user input limit will be violated, a rule-based finite state machine can output a vehicle command that maintains a vehicle 110 in lane 204 at a new target speed.

In this example, the rule-based state machine can output a vehicle command equal to "perform left lane change" to computing device 115, for example. Computing device 115 can determine a path polynomial 210 that accomplishes a left lane change maneuver into adjacent lane 206 and then operate vehicle 110 along the path polynomial 210 to accomplish the lane change maneuver. Computing device 115 can determine a path polynomial that moves vehicle 110 from lane 204 to adjacent lane 206 while maintaining vehicle 110 speed. Computing device 115 can adjust vehicle speed to match speeds determined for objects (vehicles), if any, detected in an adjacent lane 206, for example, by emitting commands to direct vehicle powertrain, braking and steering components. A vehicle command can include a plurality of vehicle commands. For example, a vehicle command can include vehicle commands "maintain target speed", "stay centered in lane", and "continue for 2.3 miles" or "stop", "wait for traffic to clear", and "turn left into left lane of roadway".

A rule-based state machine, in addition to outputting a vehicle command, can also output a message to an occupant of a vehicle 110, to inform the occupant of a vehicle command. The message can be communicated to an occupant by means of a human-machine interface (HMI), e.g., a visual display, for example a warning message on a dashboard-mounted display. In this example, a message that reads "left lane change in t seconds", wherein t corresponds to a small number of seconds, for example two or three, can be displayed. Computing device 115 can also communicate via an auditory warning by using an audio output system including a digital-to-analog (D/A) converter and a speaker to emit sound waves corresponding to a spoken language prompt, for example, "left lane change in t seconds." In response to the spoken language prompt, an occupant of a vehicle 110 can speak a natural language command that can be acquired and processed by computing device 115 using an NLU system to determine a vehicle command to operate vehicle 110. For example, in response to the message "left lane change in t seconds" an occupant can speak the natural language command "cancel lane change". In response to this input, computing device 115 can cancel the lane change maneuver by inverting a portion of path polynomial 210 that has been traveled to return vehicle 110 to lane 204. Inverting a portion of a path polynomial 210 includes mathematically reflecting the portion of the path polynomial 210 that has been traveled by the vehicle about an axis perpendicular to the direction of travel. The reflected path polynomial 210 can be traveled by vehicle 110 to return vehicle 110 to a location and direction with respect to a lane 204. Vehicle 110 speed can be adjusted to maintain a predetermined distance from another vehicle 208 in a lane 204 by sending commands to controllers 112, 113, 114 to direct vehicle 110 powertrain, brakes, and steering components to control vehicle 110 location, direction and speed.

Figure 3:
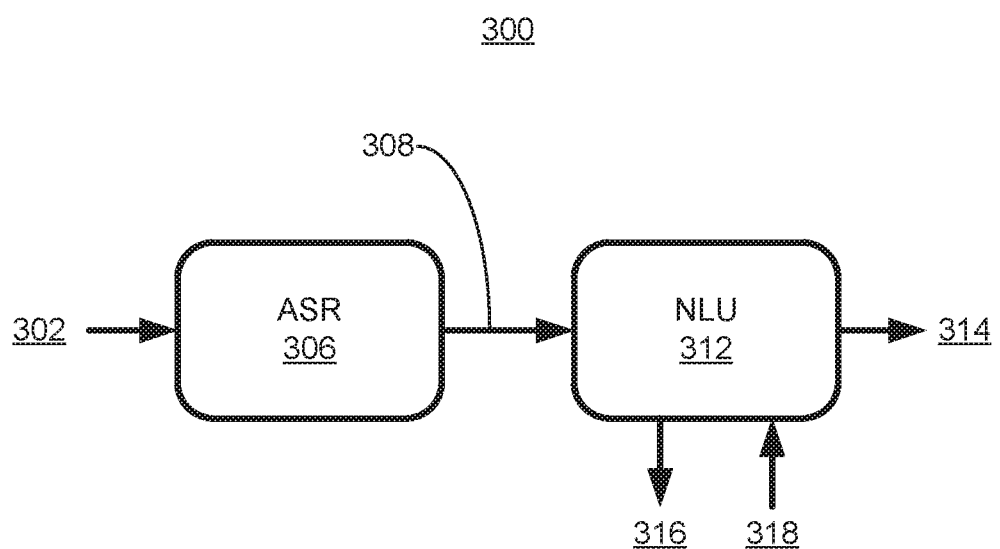
FIG. 3 is a diagram of an example vehicle language processing system.

FIG. 3. is a diagram of an example vehicle language processing system 300. Vehicle language processing system 300 inputs a spoken language command 302 and processes it to determine a vehicle command 316 and a spoken language response 314, while inputting vehicle data 318. A spoken language command is audio spectrum data corresponding to a spoken natural language command acquired by computing device 115 using an audio input system as described above in relation to FIG. 2. Vehicle language system 300 includes an automatic speech recognition (ASR) system 306 and a natural language understanding (NLU) system 312. Examples of language systems that include both an ASR system 306 and an NLU system 312 include Siri (Apple, Inc., Cupertino, Calif. 95014) and Alexa (Amazon-.com Inc., Seattle, Wash. 98109). ASR system 306 inputs audio spectrum data corresponding to spoken language commands 302. The audio spectrum data is transformed into mel-frequency data with a non-linear transformation that simulates human hearing response. The mel-frequency data is processed with a deep neural network (DNN) including a plurality of 1D convolution layers and a plurality of fully connected layers to process spoken language commands to form text data commands 308 corresponding to the spoken language commands.

TABLE 1

| | Text Data | | | | | | |
|---|---|---|---|---|---|---|---|
| | Hi | Henry | can | you | turn | on | the | radio? |
| Conf. Level | 0.1 | 0.2 | 0.3 | 0.2 | 0.3 | 0.4 | 0.5 | 0.8 |

Text data commands 308 are character-based words corresponding to the input spoken language command 302. Table 1 illustrates text data output corresponding to the spoken natural language input: "Hi Henry, can you turn on the radio?". Table 1 also includes a confidence level for each word of the output text data command 308. ASR 306 can determine a confidence level for each word of the output text data command 308 by measuring a difference between the input audio spectrum data and reconstructed noise-free audio spectrum data based on recognized text data. A confidence level is a number between 0 and 1 based on ASR system 306 determining a noise level when processing the portion of the input audio spectrum data corresponding to a word. A confidence level below 0.4 corresponds to a low confidence level, a confidence level between 0.4 and 0.7 corresponds to a medium confidence level and a confidence level above 0.7 corresponds to a high confidence level.

The ASR system 306 can be trained to determine text data from audio spectrum data including noise levels by training a DNN portion of ASR system 306 using ground truth data including audio spectrum data that has been modified by the addition of synthetically determined noise data, wherein "ground truth data" refers to result data obtained from a source independent from the system under test. Ground truth data can be empirically determined based on experiments conducted with real world noise data or analytically determined based on information regarding amplitude and spectral distribution of synthetic noise data. Noise levels can be determined by reconstructing noise-free audio spectrum data based on output text data. The reconstructed noise-free audio spectrum data can be compared to the input audio spectrum data to determine A noise level can be determined based on the amplitude and spectral distribution of a difference between reconstructed noise-free audio spectrum data and input audio spectrum data.

The synthetically determined noise data can be determined based on a vehicle noise model based on the amplitude and spectral distribution of ambient noise occurring in a vehicle 110. Ambient noise sources occurring in a vehicle 110 can include sound waves from road noise, wind noise, extraneous spoken conversations and extraneous audio system output, e.g. music or voice, for example. Each noise source can produce audio spectrum samples that include a plurality of different amplitudes and spectral distribution. A plurality of audio spectrum samples from a plurality of noise sources can be applied to a plurality of spoken language commands as noise levels to produce noisy spoken language commands. The noisy spoken language commands and the information regarding the corresponding noise levels along with information regarding corresponding text data commands can be used to train a DNN to output correct text data commands along with confidence levels as shown in Table 1. Noisy spoken language commands can also be produced using real world vehicle noise sources and recording noisy spoken language commands, labeled with the noise source amplitude and spectral content present in the sample. The labeled noisy spoken language commands and corresponding ground truth can be used to train a DNN to output text data and confidence levels corresponding to input spoken language. NLU system 312 can input a text data command 308 including confidence levels for each word of the text data command 308 and determine a vehicle command 316 and a spoken language response 314 while inputting vehicle data 318.

Figure 4:
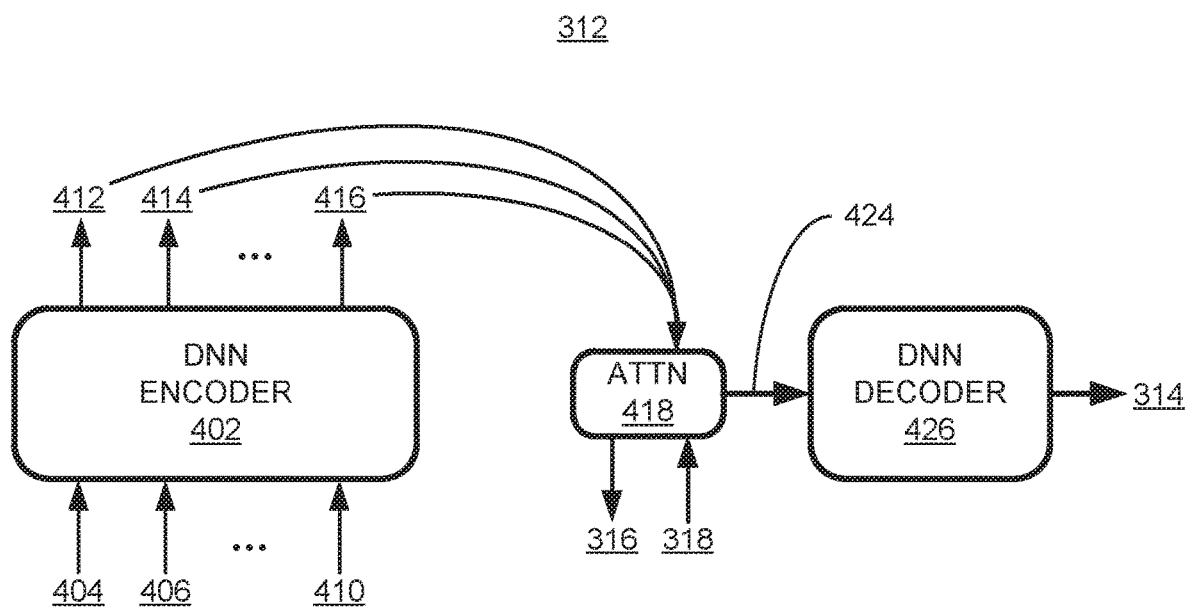
FIG. 4 is a flowchart diagram of an example natural language understanding system.

FIG. 4 is a diagram of an example natural language understanding (NLU) system 312 in more detail. NLU system 312 is a sequence to sequence (Seq2Seq) encoder/decoder similar in architecture to Google's Neural Machine Translation System (Google, Inc., Mountain View, Calif. 94043). A Seq2Seq encoder/decoder includes two similar DNNs to first encode a sequence of text data words to determine semantics or meaning corresponding to the sequence of text data words, perform an action based on the semantics, i.e. pay "attention" to the semantics and output a response. The response can be decoded by the second DNN to form a text data response. Seq2Seq NLU systems are based on the principle that a spoken language input system should be capable of responding to an input command with a spoken language response or request for information. The two DNNs include a plurality of 1D convolutional layers connected to a plurality of fully-connected computational layers configured as a long short-term memory (LSTM) recurrent neural network that permits multiple text data words in a text data phrase to contribute to a semantic output based on their relative position in the text data phrase.

NLU system 312 includes a deep neural network (DNN) encoder processing block 402 which inputs a text data command 308 as a series of text data word/confidence level pairs 404, 406, 410, wherein the ellipsis between text data word/confidence level pairs 406, 410 indicates one or more additional text data word/confidence level pair inputs. DNN encoder 402 includes 1D convolutional layers and LSTM-configured full-connected computational layers as described above and can be trained to output vehicle action/confidence level pairs 412, 414, 416, wherein the ellipsis between vehicle action/confidence level pairs 414, 416 indicates one or more additional vehicle action/confidence level pairs outputs. Each vehicle action/confidence level pair 412, 414, 416 includes a token corresponding to a vehicle action and a confidence level corresponding to the determined vehicle action.

Techniques disclosed herein improve operation of a vehicle 110 by improving NLU system 312 processing by determining a confidence level for each text data word output as a text data word/confidence level pair 404, 406, 410. The confidence level for each text data word is a combination of the confidence levels of the text data words 318 output by ASR as discussed above in relation to FIG. 3 and an importance score based on a user input measure of importance assigned to each word of an input phrase. For example, in Table 1, the wake phrase, "Hi Henry" must precede each command and therefore has high importance. The words "turn", "on", and "radio" also have high importance because they can determine a vehicle action. The words "can", "you", and "the" are nonce words and add little to the meaning of the phrase, and therefore can be assigned low importance. Text data corresponding to the input in Table 1 can be the phrase "turn on radio", wherein the confidence levels assigned to each word of the phrase is the confidence level assigned to the word from Table 1, for example.

A vehicle action is a token or string of tokens corresponding to input text data word/confidence level pairs 404, 406, 410 indicating which vehicle action, of a predetermined set of vehicle actions, should be output to attention (ATTN) processing block 418 for processing. A set of vehicle actions can be determined by users of an NLU system 312 by selecting a subset of actions that can be performed by vehicle 110 under command of computing device 115, for example. By limiting the number of vehicle actions to a subset of possible vehicle actions, the computational problem of determining vehicle actions based on input text data word/confidence level pairs 404, 406, 410 becomes tractable and thereby computable by computing device 115. Computational tasks corresponding to determining vehicle actions by NLU system 312 can also be performed by a server computer 120 via network 130. Vehicle actions have confidence levels assigned based on the combined confidence levels of the text data words input to form the vehicle actions. For example, in the example in Table 1, the high confidence in the word "radio" and the presence of both "turn" and "on" in adjacent positions near the high confidence (0.8) word "radio" would overcome their input low confidence levels (0.3, 0.4) to result in an output vehicle command equal to "turn on radio" with a high confidence level.

In examples where the confidence level assigned to a vehicle action can be "medium" or "low", ATTN processing block 418 can respond by outputting a text data response that is a query for more information. For example, if NLU system 312 assigns a "medium" confidence level to a vehicle command equal to "turn on radio", ATTN processing block 418 can respond by not outputting a vehicle command 316 but rather by outputting a text data response 314 equal to "Did you say, 'Turn on the radio?'" In an example where NLU system 312 assigns a "low" confidence level to a vehicle action, ATTN processing block 418 can respond by outputting a text data response 314 equal to "I'm sorry, I didn't understand your request could you repeat it please?" In this fashion NLU system 302 can attempt to improve the confidence level corresponding to a vehicle action by requesting more information from an occupant.

ATTN processing block 418 can be a rule-based machine intelligence system implemented as a finite state machine. ATTN processing block 418 takes as input the vehicle actions/confidence level pairs 412, 414, 416 as input to a current state. A current state of the rule-based finite state machine, based on the input vehicle actions/confidence level pairs 412, 414, 416 and internal variables, can output a vehicle command 316 to computing device 115. A vehicle command 316 is an instruction to computing device 115 regarding operation of vehicle 110 including a request for information. Computing device 115 can receive a vehicle command 316 from ATTN processing block 418 and, based on the vehicle command, operate vehicle 110 by controlling vehicle powertrain, braking and steering. Computing device 115 can reply to an ATTN processing block 418 vehicle command 316 with vehicle data 318. Vehicle data 318 can include an acknowledgement that computing device 115 is executing the vehicle command 316 or a negative acknowledgement that computing device will not be executing the vehicle command 316. Computing device 115 can reply to a vehicle command 316 requesting information by outputting vehicle data 318 corresponding to the requested information to be input by ATTN processing block 418.

In response to input vehicle actions/confidence level pairs 412, 414, 416, internal variables, and input vehicle data 318, ATTN processing block 418 rule-base finite state machine can output a vehicle response 424 to DNN decoder 426. A vehicle response 424 is a token or string of token corresponding to an encoded text data response. ATTN processing block 418 rule-based finite state machine can improve determining an output vehicle response 424 by considering a confidence level when determining the vehicle response.

DNN decoder processing block 426 can input a vehicle response 424 and based on previous training determine a text data response 314 that corresponds to the input vehicle response 424. DNN decoder processing block 426 can be trained using a set of vehicle responses 424 along with ground truth in the form of text data responses 314 corresponding to the vehicle responses 424. Once trained in this fashion, DNN decoder processing block 426 can reliably output text data responses 314 corresponding to the input vehicle responses 424. Output text data responses 314 can be converted to audio spectrum data by computing device 115 and output as sound waves with an audio output system as described above in relation to FIG. 2.

Figure 5:
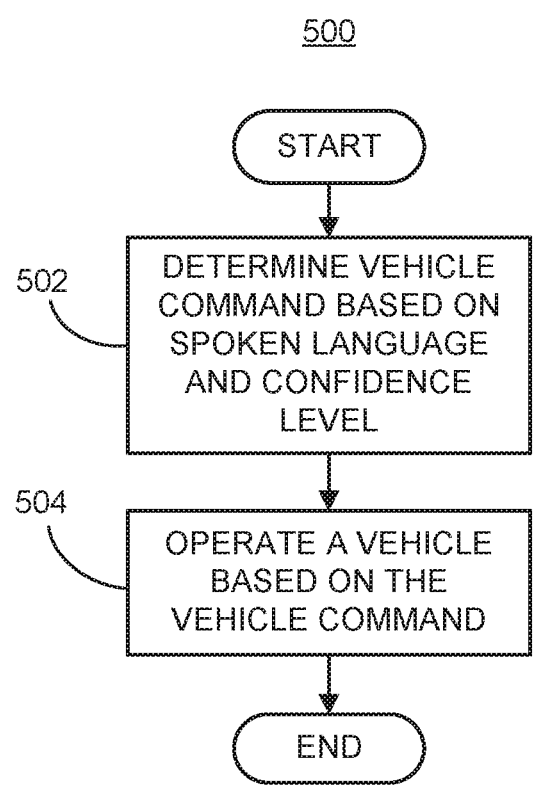
FIG. 5 is a flowchart diagram of a process to operate a vehicle based on natural language understanding.

FIG. 5 is a diagram of a flowchart, described in relation to FIGS. 1-4, of a process 500 for operating a vehicle 110 based on receiving spoken language commands. Process 500 can be implemented by a processor of computing device 115, taking as input information from sensors 116, and executing commands and sending control signals via controllers 112, 113, 114, for example. Process 500 includes multiple blocks taken in the disclosed order. Process 500 could alternatively or additionally include fewer blocks or can include the blocks taken in different orders.

Process 500 begins at block 502, where a computing device 115 in a vehicle can determine a vehicle command 316 based on a spoken language command 302. As discussed above in relation to FIGS. 2-4, computing device 115 can acquire and convert sound waves corresponding to spoken language commands and convert them to audio spectrum data. The audio spectrum data can be processed by and ASR system 306 to determine text data commands including text data words and confidence levels 404, 406, 410. The text data words and confidence levels 404, 406, 408 are processed by NLU system 312 to output a vehicle command 316, input vehicle data 318 and determine an output text data response 424, wherein the vehicle command 316 and output text data response 424 are based on the text data words and confidence levels 404, 406, 410.

At block 504, computing device 115 can input a vehicle command 316 and operate vehicle 110 based on the vehicle command as discussed above in relation to FIG. 2. Based on the vehicle command 316, computing device 115 can determine a path polynomial 210 upon which to direct the operation of vehicle 110. Computing device 115 can operate vehicle 110 to travel along a path polynomial 210 by transmitting instructions to controllers 112, 113, 114 to direct vehicle 110 powertrain, braking and steering to control vehicle 110 location, direction and speed as discussed above in relation to FIG. 1. Computing device 115 can acquire data from sensors 116 to confirm vehicle location, direction and speed. Computing device 115 can output the text data response 314 as sound waves to confirm to an occupant of a vehicle 110 that a spoken language command was properly received and is being executed by computing device 115. Following block 504 process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method, comprising:
    determining a spoken language command by processing audio spectrum data corresponding to a spoken natural language with an automatic speech recognition (ASR) system, including determining respective confidence levels for words of the spoken language command based on a vehicle noise model,
    wherein the vehicle noise model is determined by a deep neural network that accepts as input vehicle background noise and the audio spectrum data, and outputs the words of the spoken language command and their respective confidence levels,
    wherein the deep neural network is trained with labeled vehicle noise sources recorded with training spoken language commands;
    inputting the determined spoken language command and the respective determined confidence levels for the words of the spoken language command to a neural network encoder of a natural language understanding (NLU) system that outputs, to a neural network decoder of the NLU, pairs of text data words and respective confidence levels for each of the text data words;
    outputting a vehicle action from a neural network decoder based on the pairs of text data words and respective confidence levels; and
    operating a vehicle based on the vehicle action.

2. The method of claim 1, wherein the deep neural network decoder is trained using ground truth based on spoken language commands translated into vehicle commands and simulated vehicle noise based on the vehicle noise model.

3. The method of claim 1, wherein operating the vehicle includes determining a path polynomial.

4. A system, comprising a processor; and
    a memory, the memory including instructions to be executed by the processor to:
    determine a spoken language command by processing audio spectrum data corresponding to a spoken natural language with an automatic speech recognition (ASR) system, including determining respective confidence levels for words of the spoken language command based on a vehicle noise model,
    wherein the vehicle noise model is determined by a deep neural network that accepts as input vehicle background noise and the audio spectrum data, and outputs the words of the spoken language command and their respective confidence levels,
    wherein the deep neural network is trained with labeled vehicle noise sources recorded with training spoken language commands;
    input the determined spoken language command and the respective determined confidence levels for the words of the spoken language command to a neural network encoder of a natural language understanding (NLU) system that outputs, to a neural network decoder of the NLU, pairs of text data words and respective confidence levels for each of the text data words;
    output a vehicle action from a neural network decoder based on the pairs of text data words and respective confidence levels; and
    operate a vehicle based on the vehicle action.

5. The system of claim 4, wherein the deep neural network decoder is trained using ground truth based on spoken language commands translated into vehicle commands and simulated vehicle noise based on the vehicle noise model.

6. The system of claim 4, wherein operating the vehicle includes determining a path polynomial.

7. A system, comprising:
    means for controlling vehicle steering, braking and powertrain; and
    means for:
        determining a spoken language command by processing audio spectrum data corresponding to a spoken natural language with an automatic speech recognition (ASR) system, including determining respective confidence levels for words of the spoken language command based on a vehicle noise model,
        wherein the vehicle noise model is determined by a deep neural network that accepts as input vehicle background noise and the audio spectrum data, and outputs the words of the spoken language command and their respective confidence levels,
        wherein the deep neural network is trained with labeled vehicle noise sources recorded with training spoken language commands;
    inputting the determined spoken language command and the respective determined confidence levels for the words of the spoken language command to a neural network encoder of a natural language understanding (NLU) system that outputs, to a neural network decoder of the NLU, pairs of text data words and respective confidence levels for each of the text data words;
    outputting a vehicle action from a neural network decoder based on the pairs of text data words and respective confidence levels; and
    operating a vehicle based on the vehicle action.

* * * * *